(12) United States Patent
Manas-Zloczower et al.

(10) Patent No.: US 11,635,156 B2
(45) Date of Patent: Apr. 25, 2023

(54) AIR BRAKE TUBING AND COMPOSITIONS FOR MAKING THE SAME

(71) Applicant: Danfoss A/S, Nordborg (DK)

(72) Inventors: Iani Manas-Zloczower, Orange, OH (US); Brett William Schultz, Burton, OH (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/385,411

(22) Filed: Jul. 26, 2021

(65) Prior Publication Data

US 2022/0065368 A1 Mar. 3, 2022

Related U.S. Application Data

(63) Continuation of application No. 16/797,645, filed on Feb. 21, 2020, now Pat. No. 11,105,445, which is a (Continued)

(51) Int. Cl.
*F16L 9/12* (2006.01)
*C08L 75/08* (2006.01)
(Continued)

(52) U.S. Cl.
CPC .................. *F16L 9/12* (2013.01); *B32B 1/08* (2013.01); *B32B 27/08* (2013.01); *B32B 27/20* (2013.01); *B32B 27/22* (2013.01); *B32B 27/34* (2013.01); *B32B 27/36* (2013.01); *B32B 27/40* (2013.01); *B60T 17/04* (2013.01); *C08L 67/02* (2013.01); *C08L 75/08* (2013.01); *F16L 11/085* (2013.01); *F16L 11/088* (2013.01); *B32B 2250/24* (2013.01); *B32B 2264/102* (2013.01); *B32B 2264/104* (2013.01); *B32B 2264/108* (2013.01); *B32B 2270/00* (2013.01); *B32B 2307/4026* (2013.01); *B32B 2307/536* (2013.01); *B32B 2307/54* (2013.01); *B32B 2307/558* (2013.01); *B32B 2597/00* (2013.01); *C08L 77/02* (2013.01); *C08L 77/06* (2013.01)

(58) Field of Classification Search
CPC . F16L 9/12; F16L 11/088; C08L 67/02; C08L 75/08
USPC .................................................. 138/137, 155
See application file for complete search history.

(56) References Cited

U.S. PATENT DOCUMENTS

| 4,467,837 A | 8/1984 | Baker |
| 6,089,278 A | 7/2000 | Nishino et al. |

(Continued)

FOREIGN PATENT DOCUMENTS

| DE | 10 2007 011 287 | 9/2008 |
| EP | 2 402 224 | 1/2012 |

(Continued)

OTHER PUBLICATIONS

International Search Report and Written Opinion for PCT/US2013/061402 dated Dec. 3, 2013.

(Continued)

*Primary Examiner* — Vishal Pancholi
(74) *Attorney, Agent, or Firm* — Merchant & Gould, P.C.

(57) ABSTRACT

Air brake tubing is provided having an air brake tube body comprising at least one layer formed from a composition comprising a copolyester, polyethylene terephthalate or polybutylene terephthalate; and a thermoplastic polyurethane.

21 Claims, 6 Drawing Sheets

Related U.S. Application Data continuation of application No. 15/698,388, filed on Sep. 7, 2017, now Pat. No. 10,571,050, which is a continuation of application No. 14/035,424, filed on Sep. 24, 2013, now Pat. No. 9,759,353.

(60) Provisional application No. 61/768,788, filed on Feb. 25, 2013, provisional application No. 61/704,835, filed on Sep. 24, 2012.

(51) Int. Cl.
| | |
|---|---|
| *B32B 27/08* | (2006.01) |
| *B32B 27/20* | (2006.01) |
| *B32B 27/22* | (2006.01) |
| *B32B 27/34* | (2006.01) |
| *B32B 27/36* | (2006.01) |
| *B32B 27/40* | (2006.01) |
| *B32B 1/08* | (2006.01) |
| *B60T 17/04* | (2006.01) |
| *C08L 67/02* | (2006.01) |
| *F16L 11/08* | (2006.01) |
| *C08L 77/02* | (2006.01) |
| *C08L 77/06* | (2006.01) |

(56) References Cited

U.S. PATENT DOCUMENTS

| | | |
|---|---|---|
| 6,142,189 A | 11/2000 | Bhattacharyya |
| 6,227,249 B1 | 5/2001 | Akedo et al. |
| 6,670,004 B1 | 12/2003 | Green |
| 6,776,195 B2 | 8/2004 | Blasko et al. |
| 6,807,988 B2 | 10/2004 | Powell et al. |
| 6,855,787 B2 | 2/2005 | Funaki et al. |
| 7,579,058 B2 | 8/2009 | Dowe et al. |
| 2003/0145896 A1 | 8/2003 | Green et al. |
| 2004/0058111 A1 | 3/2004 | Manas-Zloczower et al. |
| 2004/0096615 A1 | 5/2004 | Manas-Zloczower et al. |
| 2004/0134555 A1 | 7/2004 | Powell et al. |
| 2006/0151038 A1 | 7/2006 | Gregrich |
| 2007/0087150 A1 | 4/2007 | Powell et al. |
| 2010/0104790 A1 | 4/2010 | Blom |
| 2011/0177274 A1 | 7/2011 | Lumig Van et al. |
| 2012/0000562 A1 | 1/2012 | Hoffmann et al. |

FOREIGN PATENT DOCUMENTS

| | | |
|---|---|---|
| WO | 2007/023285 | 3/2007 |
| WO | 2007/082710 | 7/2007 |
| WO | 2008/110326 | 9/2008 |

OTHER PUBLICATIONS

Declaration of Brett W. Schultz under 37 CFR 1.132, dated Apr. 12, 2016, 4 pages total.

Copolyester/PET/PBT/Concentration Ranges

Copolyester/PET/PBT Hardness (Durometer reading, Shore scale)

Polyurethane Concentration Ranges

Polyurethane Hardness (Durometer reading, Shore scale)

Polyamide Concentration Ranges

AIR BRAKE TUBING AND COMPOSITIONS FOR MAKING THE SAME

CROSS-REFERENCES TO RELATED APPLICATIONS

This application is a continuation of U.S. Application Ser. No. 16/797,645, filed Feb. 21, 2020, now issued as U.S. Pat. No. 11,105,445, which is a continuation of U.S. application Ser. No. 15/698,388, filed Sep. 7, 2017, now issued as U.S. Pat. No. 10,571,050, which is a continuation application of U.S. application Ser. No. 14/035,424, filed Sep. 24, 2013, now issued as U.S. Pat. No. 9,759,353, which claims the benefit of U.S. Provisional Application No. 61/704,835, filed Sep. 24, 2012, and U.S. Provisional Application No. 61/768,788, filed Feb. 25, 2013, the entire contents of each of which is incorporated herein by reference.

FIELD

Air brake tubing is provided having an air brake tube body comprising at least one layer formed from a composition comprising a copolyester, polyethylene terephthalate or polybutylene terephthalate; and a thermoplastic polyurethane.

BACKGROUND

Heavy-duty vehicles are typically equipped with air brakes operated by compressed air that is lead through a system of air brake hoses and valves to the brakes. Connecting multiple trailers on vehicles such as trucks, trailers and semi-trailers to the brake system may be conveniently done using flexible air brake tubing that can be either coiled or straight. However, the conditions of the road and safety concerns place many requirements on the tubing that is exposed to the environment.

Even in normal use, air brake tubing is often subject to environmental and mechanical stresses. Therefore, to ensure safe operation of vehicles, air brake tubing is subject to various government and industry regulations. The quality and performance of air brake tubing is controlled, for example, by SAE Standard J2494 (Push-To-Connect Tube Fittings for Use in the Piping of Vehicular Air Brake), SAE Standard J1402 (Automotive Air Brake Hose and Hose Assemblies), SAE Standard J844 (Nonmetallic Air Brake System Tubing), SAE Standard J2547 (Nonmetallic Air Brake System Tubing), and SAE Standard J1131 (Performance Requirements for SAE J844 Nonmetallic Tubing and Fitting Assemblies Used in Automotive Air Brake Systems), as well as NHSA/DOT FMVSS 106 (49 C.F.R. § 571.106).

Air brake tubing sizes can vary with slightly different requirements for each size. For example, acceptable tubing sizes include outer diameter (O.D.) ⅛ inch, 5/32 inch, 3/16 inch, ¼ inch, 5/16 inch, ⅜ inch, ½ inch, ⅝ inch and ¾ inch, with corresponding nominal inside diameter (I.D.) of 0.156, 0.187, 0.218. 0.281. 0.343, 0.406, 0.531, 0.656 and 0.800 inches. Typically, air brake tubing with an O.D.<5/16 inch is type A non-reinforced tubing, and above ⅜ inch O.D. is type B reinforced tubing.

In the past air brake hoses have most commonly been manufactured from polyamides such as polyamide 11, polyamide 12 or polyamide 6, copolyesters, or polyamide/copolyester alloys as taught by, for example, U.S. Pat. No. 6,670,004 and U.S. Patent Application Publication No. 2007/0087150 A1. One problem with tubing prepared exclusively from polyamide, for example, PA12, is meeting SAEJ844/DOT FMVSS 571.106 cold temperature impact testing requirements, such as those described in sections 11.3.10 and 11.3.11 of DOT standards, and section 9.10 in SAE standard.

Alternative tubing composition constructions have been explored due to global supply shortages of polyamides. Many tubing manufacturers have turned to the use of copolyesters; however, most commercially available copolyesters require further manipulation in order to meet relevant SAE and DOT requirements. For example, tubing formed from a copolyesters alone, or even a blend of two different copolyesters of different durometers, can come close to failing the SAEJ844 stiffness test. In addition, the all copolyester design suffered from limited customer acceptance compared to the previously proven polyamide design. Prior attempts at resolving these problems resulted in tubing formed from a blend of copolyester and polyamide that improved tubing stiffness, but cold temperature impact performance was inconsistent from lot to lot. Other disadvantages of air brake hoses formed from a polyamide/copolyester blends include poor chemical resistance, and moisture issues.

It would be beneficial to provide a composition for making air brake hoses that meets all of the performance requirements and utilizes materials that are cost effective and widely available.

SUMMARY

Air brake tubing is provided comprising an air brake tube body having at least one layer formed from a composition comprising copolyester, polyethylene terephthalate and/or polybutylene terephthalate; and thermoplastic polyurethane. In some embodiments, the air brake tubing composition further comprises polyamide. In some embodiments, the air brake tubing meets all SAE/DOT requirements for air brake hoses.

In some embodiments, tubing is provided that is suitable for use in pneumatic or hydraulic applications, the tubing formed from a composition comprising about 15-75% by weight copolyester, polyethylene terephthalate or polybutylene terephthalate or combinations thereof; and about 15-75% by weight thermoplastic polyurethane. In some embodiments, the tubing is air brake tubing.

As used herein the term "air brake tube body" is defined as a tube body capable of meeting the performance requirements of one or more of SAE J844, SAE J2547 and DOT FMVSS 106 standards.

In some embodiments, the air brake tubing is capable of meeting the performance requirements of SAE J844, SAE J2547 and DOT FMVSS 106.

In some embodiments, the air brake tubing is mono-wall construction. In some embodiments, the tube body comprises reinforcement. In some embodiments, the air brake tubing has a multi-layer construction.

In some embodiments, the air brake tubing body comprises at least one layer formed from a composition comprising about 15-75 wt % copolyester or polybutylene terephthalate; or about 40-50 wt % copolyester or polybutylene terephthalate; and about 15-75% by weight polyurethane. In some embodiments, the composition comprises about 0-10% by weight polyamide.

In some embodiments, the disclosure provides tubing suitable for use in pneumatic or hydraulic applications, the tubing formed from a composition comprising about 15-75% by weight copolyester, polyethylene terephthalate or polybutylene terephthalate or combinations thereof; and about 15-75% by weight polyurethane. In some embodiments, the tubing is suitable for use in vehicle air brake hoses. In some embodiments, the tubing is an air brake hose is capable of meeting the performance requirements of SAE J844, SAE J2547 and DOT FMVSS 106. In some embodiments, the tubing comprises about 30-60% by weight copolyester, polyethylene terephthalate, polybutylene terephthalate or combinations thereof. In some embodiments, the tubing comprises about 40-50% by weight copolyester, polyethylene terephthalate, polybutylene terephthalate or combinations thereof; and about 30-60% by weight polyurethane.

In some embodiments, the tubing is formed from a composition comprising about 40-50 wt % by weight polyurethane. In some embodiments, the composition comprises about 0-50% wt %; 1-15 wt %; 3-12 wt %; or about 5-10 wt % polyamide. In some embodiments, the composition is a blend, alloy or copolymer.

Modifications and variations can be made to the embodiments without departing from the spirit and scope of the disclosure.

DETAILED DESCRIPTION

The present application relates to tubing suitable for use in air brake systems and other pneumatic or hydraulic applications and to material compositions for making the same. In particular, the present application relates to materials suitable for Type A (non-reinforced) and Type B (reinforced) air brake tubing.

Polymeric air brake tubing comprising one or more layers formed from a composition comprising (a) one or more of a copolyester, polyethylene terephthalate and/or polybutylene terephthalate; and (b) polyurethane is provided. In some embodiments, the air brake tubing comprises at least one layer formed from a composition comprising (a) one or more of a copolyester, polyethylene terephthalate and/or polybutylene terephthalate; (b) a polyurethane; and (c) a polyamide. The compositions can be used for manufacturing mono-layer tubing, reinforced tubing or multi-layer tubing. The polymeric air brake tubing provided herein meets performance requirements specified in SAE and DOT standards.

Figure 1:
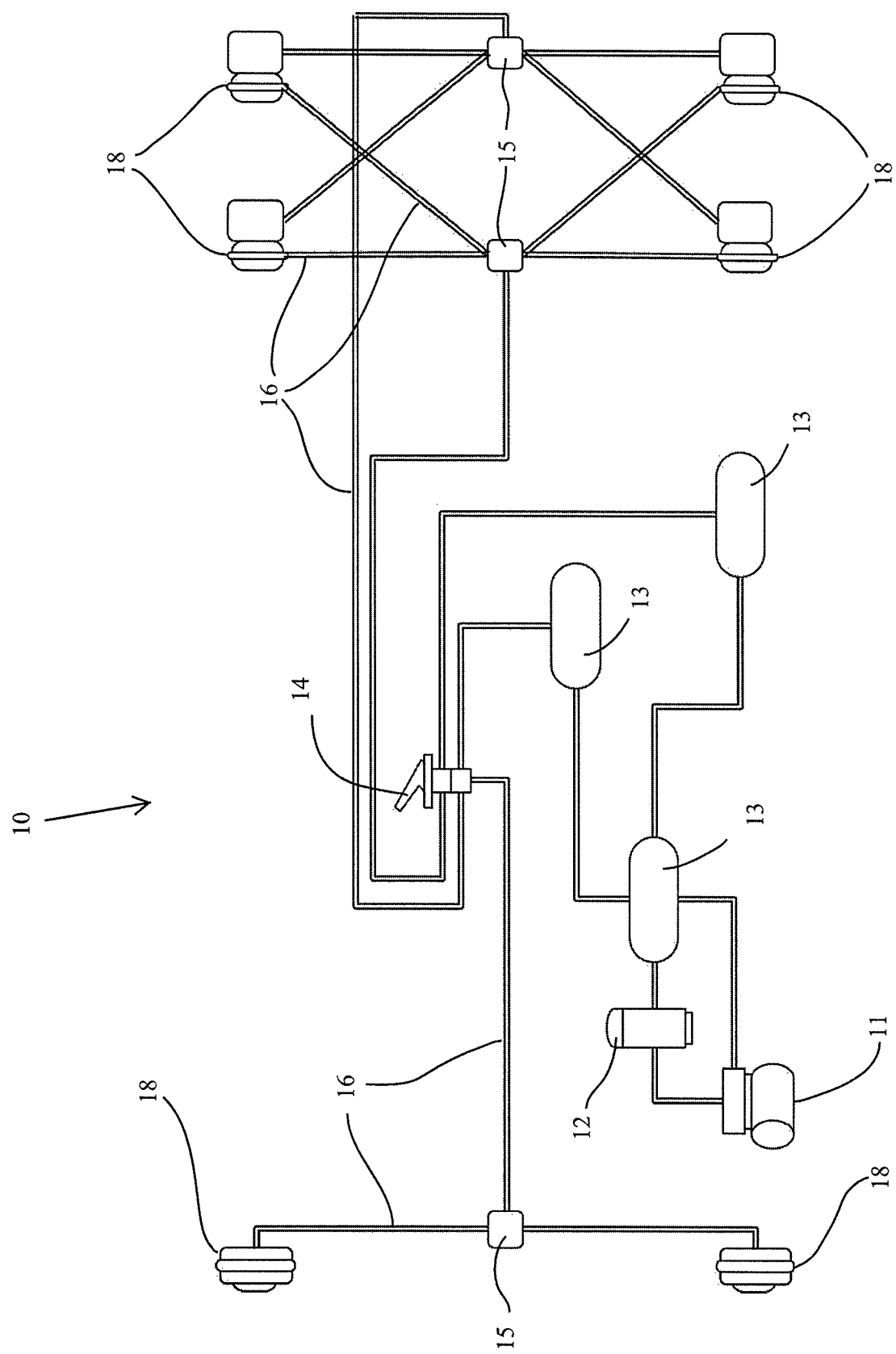
FIG. 1 is a schematic drawing of an air brake system according to an embodiment.

FIG. 1 shows an example of an air brake system 10 used in vehicles. Compressed air is generated in the air compressor 11 and dried using an air dryer 12. Dried air can be stored in one or more compressed air storage/supply tanks 13. When brakes are applied by pressing on the foot valve 14, compressed air is led to the brake chambers 18 through air brake hoses 16 (i.e. air brake tubing). Alternatively, brakes can be applied by a hand control valve (e.g., the park brake). The compressed air can also be regulated by various other modulators and valves 15 such as control valves, protection valves, safety release valves and load sensing valves (not shown). The brake system 10 of a vehicle may also be connected to the brake system of another vehicle unit such as a trailer. When in use, air brake hoses are exposed to wear and tear, and the road conditions, such as heat, cold and moisture, and various chemicals such as road salt, oil, etc.

Air brake tubing is typically constructed of a thermoplastic core inner layer that may optionally be reinforced by a layer of wound or braided material and protected by an outer layer that can withstand abrasion and wear. The possible materials and construction used to make air brake tubing are limited by the requirement to withstand multiple stressors, including environmental and mechanical stress factors as articulated in the regulatory requirements set by the SAE (such as SAE Standard J844 and J2547) and DOT (such as DOT FMVSS 106). The test parameters along with the required limits for ¼ inch tubing are listed in TABLE 1. For example, the tubing must meet particular requirements for withstanding extreme temperatures and exposure to moisture and chemicals and yet remain pliable and impact and burst resistant. Some other test parameters include, for example, ambient burst strength, moisture absorption, zinc chloride resistance, stiffness, and tensile strength. In order to pass the requirements for the Boiling Water Conditioning and Tensile Strength (hot pull) test, the test criteria allows for meeting either the minimum 50 lbf(L) or minimum % elongation of 50% (L) specifications. Polyamide ("PA") 12 is a common material for manufacturing air brake tubing, but when used by itself in a single layer (e.g., a mono-wall tube), PA12 may not have optimal cold temperature impact resistance. On the other hand, copolyester, another popular material for air brake tubing, is relatively inflexible, and a construction using copolyester only may have difficulty meeting the stiffness requirements.

TABLE 1

| | DOT/SAE Standard Test Limits. | |
|---|---|---|
| Test | DOT (D)/ SAE (S) | Requirements for ¼ inch O.D. tube (L = lower limit, U = upper limit) |
| Constriction | D | I.D. >66% of nominal, Pass/Fail |
| High T. Cond. & Dimensional Stability | D | Dimensions shall not exceed specified values, Pass/Fail |
| Boiling Water Cond. & Dimensional Stability | | |

TABLE 1-continued

DOT/SAE Standard Test Limits.

| Test | DOT (D)/ SAE (S) | Requirements for ¼ inch O.D. tube (L = lower limit, U = upper limit) |
|---|---|---|
| Ambient Burst Strength | D & S | 1206 psi (L) |
| Moisture Absorption and Burst Strength, psi | D & S | 2% (U) and 960 psi (L) |
| Ultraviolet Light Resistance | D & S | 960 psi (L) |
| Low/Cold T. Flexibility | D & S | Pass/Fail |
| High T. Flexibility & Burst Strength | D & S | 960 psi (L) |
| High T. Resistance & Burst Strength | D & S | 960 psi (L) |
| High T. Cond. (72 h) & Cold T. Impact | D | 960 psi (L) |
| High T. Cond. (24 h) & Cold T. Impact | S | 960 psi (L) |
| Boiling Water Cond. & Cold T. Impact | D & S | 960 psi (L) |
| Zinc Chloride Resistance | D & S | No visible cracks, Pass/Fail |
| Methyl Alcohol Resistance | D & S | No visible cracks, Pass/Fail |
| High T. Cond. & Collapse Resistance | D & S | 20% (U) |
| Ozone Resistance | D | No visible cracks, Pass/Fail |
| Oil Resistance | D | 960 psi (L) |
| Tensile Strength | D | 50 lbf (L) |
| Boiling Water Cond. & Tensile Strength (hot pull), lbf | D & S | 50 lbf (L) or 50% (L) |
| Thermal Cond. &Tensile Strength (Conditioned), lbf | D & S | 50 lbf (L) and 50% (L) |
| Vibration Resistance | D & S | 50 sccm @ 1M cycles, 25 sccm after 1 h rest |
| End Fitting Retention | D & S | 960 psi (L) |
| Thermal Cond. & End Fitting Retention | D & S | No rupturing or disconnect, Pass/Fail |
| End Fitting Serviceability | D & S | Leakage <25 sccm |
| End Fitting Corrosion Resistance | D | No base metal corrosion, Pass/Fail |
| Stiffness | S | 2 lbs (U) |
| Adhesion | S | N/A |
| Heat Aging Adhesion | S | N/A |

T. = Temperature,
Cond. = Conditioning

The shortcomings of the materials typically used for making air brake hoses can be overcome by combining polymers with different properties in a composition (e.g., a blend, alloy or co-polymer) that fulfills the regulatory requirements set by the SAE and DOT. According to an embodiment, a composition suitable for tubing used in air brake systems and other pneumatic or hydraulic applications may comprise a combination of copolyester, polyethylene terephthalate and/or polybutylene terephthalate and thermoplastic polyurethane and optionally polyamide (e.g., impact modified polyamide). The combination of polymers benefits from the better processability and temperature performance of copolyester, polyethylene terephthalate and/or polybutylene terephthalate and the flexibility and hydrolytic stability of polyurethane. Referring to FIGS. 2A through 2F, ranges of components of compositions according to embodiments are shown.

Figure 2A:
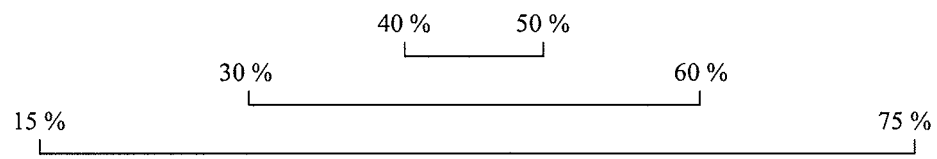
FIG. 2A shows copolyester/PET/PBT concentration ranges used in compositions for forming an airbrake tubing body layer.

As shown in FIG. 2A, in some embodiments, the composition comprises approximately 15-75 wt %, or approximately 30-60 wt %, or approximately 40-50 wt % of one or more copolyester, polyethylene terephthalate (PET) and/or polybutylene terephthalate (PBT), compared to the total weight of the unfilled composition.

In some embodiments, the composition comprises one or more copolyesters. Copolyesters are selected from thermoplastic copolyester based elastomers. In some embodiments, the composition comprises a copolyester combination of a hard segment of polyester (PBT) and a soft segment of polyethers or polyester. In some embodiments, the copolyester can impart stiffness under high temperature conditions. In some embodiments, the copolyester does not contain an elastomer. In some embodiments, the copolyester is an extrusion grade copolyester elastomer. In some embodiments, the copolyester is selected from a commercially available copolyester. In some embodiments, the copolyester is selected from a commercially available copolyester, for example, from Dupont or DSM Engineering Plastics, Inc. In some embodiments, the copolyester is selected from EM630-H, 63 Shore D hardness, extrusion grade copolyester elastomer, Arnitel® (DSM Engineering Plastics, Inc.); EM630, 60 Shore D, extrusion grade copolyester elastomer, Arnitel® (DSM Engineering Plastics, Inc.); and EM740, 74 Shore D, extrusion grade copolyester elastomer, Arnitel® (DSM Engineering Plastics, Inc.).

In some embodiments, the composition comprises one or more polybutylene terephthalates (PBT). In some embodiments, the PBT is a partially crystalline saturated polyester based on polybutylene terephthalate (PBT). In some embodiments, the PBT is a commercially PBT such as an Arnite® (DSM) or Ultradur® PBT (BASF). The PBT can be unreinforced, or reinforced, for example, with glass fiber, or mineral reinforced. In some embodiments, the PBT is impact modified.

In some embodiments, the composition comprises one or more polyethylene terephthalates (PET). Polyethylene terephthalate is a copolymer polyester. PET can be prepared from, for example, an esterification reaction between terephthalic acid and ethylene glycol; or by transesterification between, for example, ethylene glycol and dimethyl terephthalate. The polyethylene terephthalate can be a commercially available polyethylene terephthalate. In some embodiments, the composition comprises a polyethylene terephthalate such as Array™ 9921 polyethylene terephthalate (DAK Americas).

Figure 2B:
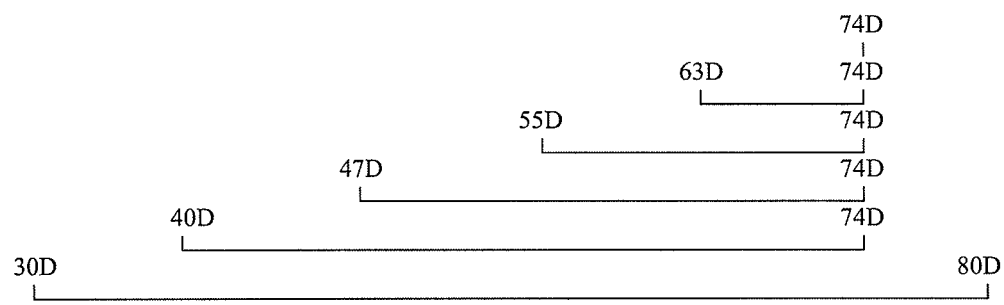
FIG. 2B shows copolyester/PET/PBT hardness ranges used in compositions for forming an airbrake tubing body layer.

Copolyesters, polyethylene terephthalates and/or polybutylene terephthalates of varying hardness can be used as shown in FIG. 2B. In some embodiments, the copolyester, polyethylene terephthalate and/or polybutylene terephthalate exhibits a durometer reading of about 30D-80D on the Shore scale, or about 40D-74D, or about 47D-74D, or about 55D-74D, or about 63D-74D, or about 63D. In some embodiments, the copolyester, polyethylene terephthalate and/or polybutylene terephthalate exhibits a durometer reading of about 74D. In some embodiments, two known durometers of copolyester are combined in the composition, for example, 63D and 74D. Different types of copolyester, polyethylene terephthalate and/or polybutylene terephthalate or blends, alloys or co-polymers including one or more of such materials may be used.

Figure 2C:
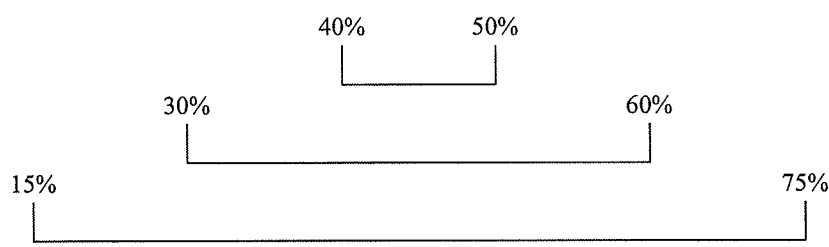
FIG. 2C shows thermoplastic polyurethane concentration ranges used in compositions for forming an airbrake tubing body layer.

As shown in FIG. 2C, in some embodiments, the composition comprises approximately 15-75 wt %, or approximately 30-60 wt %, or approximately 40-50 wt % polyurethane, compared to the total weight of the unfilled composition. The polyurethane is a thermoplastic polyurethane (TPU) is selected from one or more TPUs. A polyurethane is a polymer composed of organic units joined by carbamate (urethane) links. Polyurethane polymers are generally formed by reacting an isocyanate with a polyol. The isocyanates and polyols contain on average two or more functional groups per molecule. Thermoplastic polyurethanes (TPUs) are thermoplastic elastomers that can exist in a molten state when subject to heat. TPUs consist of linear segmented block copolymers composed of hard and soft segments. TPUs are formed, for example, from three components: (a) diisocyanates, (b) short chain diols (chain extenders); and (3) long chain bifunctional diols (polyols). The hard block is constructed from a chain extender and isocyanate and can impart the TPU with toughness and physical performance properties. The soft block is constructed from a polyol and an isocyanate and can impart flexibility and elastomeric character to the TPU. Various TPU properties can include elasticity, transparency, and resistance to oil, grease, and abrasion. In some embodiments the brake line tubing is formed from a composition comprising copolyester, polyethylene terephthalate and/or polybutylene terephthalate; and a thermoplastic polyurethane. In some embodiments, the polyurethane is a polyether-based polyurethane. In some embodiments, the thermoplastic polyurethane (TPU) is a commercially available TPU. In some embodiments, the TPU is selected from a commercially available polyether-based polyurethane selected from a BASF Elastollan® TPU or a Huntsman TPU. In some embodiments, for example, the TPU is a polyether-based TPU selected from BASF 1164D (Shore D hardness 64), BASF 1154D (Shore D hardness 53), Huntsman D64P4777 (Shore D hardness 62) or Huntsman A98P4535 (Shore D hardness 51). In some embodiments, the polyurethane is a polyester-based polyurethane.

Figure 2D:
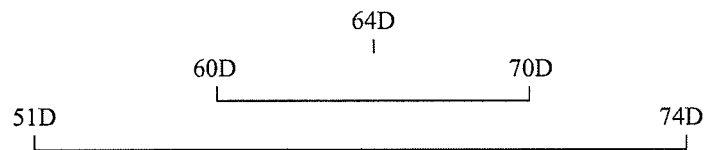
FIG. 2D shows thermoplastic polyurethane hardness ranges used in compositions for forming an airbrake tubing body layer.

Polyurethanes of varying hardness can be used as shown in FIG. 2D. For example, in some embodiments, the polyurethane exhibits a durometer reading of about 51D-74D on the Shore scale, or about 60D-70D, or about 64D. Different types of polyurethane may be used, such as for example a polyester or a polyether type or blends, alloys or co-polymers that include polyurethane.

Figure 2E:
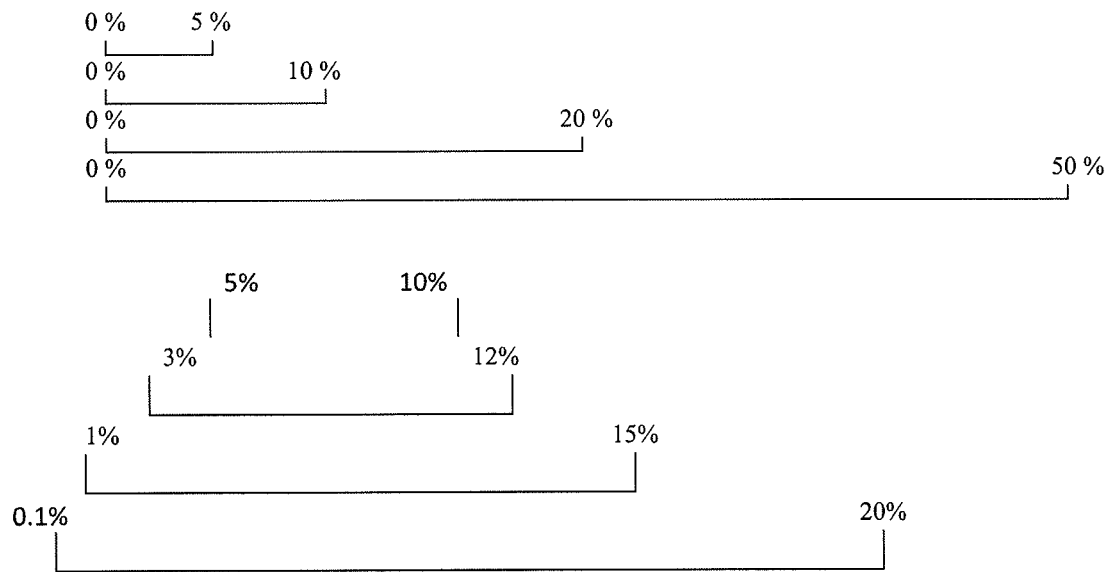
FIG. 2E shows polyamide concentration ranges used in compositions for forming an airbrake tubing body layer.

In some embodiments, the composition comprises one or more polyamides (nylon). As shown in FIG. 2E, in some embodiments, the composition may additionally comprise approximately 0-50 wt %, or approximately 0-20 wt %, or approximately 0-10 wt %, or approximately 0-5 wt % polyamide compared to the total weight of the unfilled composition. In other embodiments, the composition comprises polyamide in approximately 0.1-20 wt %, or approximately 1-15 wt %, or approximately 3-12 wt %, compared to the weight of the total weight of the unfilled composition.

In some specific embodiments, the composition comprises approximately 5 wt %, or approximately 10 wt % polyamide. Various types of polyamide or blends, alloys or co-polymers that include one or more polyamides may be used. For example, the polyamide may include one or more of the following polyamides: PA612, PA6, PA12, PA66, PA610, PA1010, PA1012, PA11, PA12 or PA1212, and may be either plasticized or unplasticized. In some embodiments, the polyamide is an impact modified polyamide. In some embodiments, the polyamide is selected from PA6, PA612, or PA610. In some embodiments, the polyamide is an impact modified PA612. In some embodiments, the PA is a commercially available PA. In some embodiments, the PA is a commercially available PA612, such as Grilamid® 2D, (EMS-Grivory); In some embodiments, the PA is a commercially available PA610, such as Grilamid® 2S, (EMS-Grivory), or Ultramid® S Balance (BASF). In some embodiments, the PA is a regrind, or recycled PA.

In some embodiments, the composition comprises other additives such as heat and light stabilizers, impact modifiers, lubricants, wetting agents, antioxidants, pigments, dyes, colorants, colorings, or opacifying agents such as for coloring-coding of the tubing, luminescents, light reflectants, chain extending oils, tackifiers, blowing agents, foaming or anti-foaming agents, reinforcements such as glass, carbon, or textile fibers, and fire retardants such as halogenated compounds, metal oxides and salts, The additives may be in liquid, powder, particulate, flake, fiber, or other form. The impact modifier may be a maleic anhydride (MAH) grafted polyolefin (Fusabond®, Dupont), or an ethylene/methacrylic copolymer-based ionomer resin such as Suryln®, (DuPont, Wilmington, Del.), or other ethylene copolymer resin which may be a high-molecular-weight copolymer resin such as an EVACO (ethylene/vinyl acetate/carbon monoxide), EBACO (ethylene/butyl acrylate/carbon monoxide), or EnBAGMA (ethylene/n-butyl acrylate/glycidyl methacrylate) terpolymer resin (Elvaloy®, Dupont). The heat age stabilizer, in turn, may be a hindered amine, or a proprietary additive such as "E1" from DSM Engineering Plastics (Evansville, Ind.). Typically, the optional additives are blended or otherwise admixed with the composition, and may comprise between about 0.01 wt % and 10 wt %; or between about 0.05 wt % and 5 wt %; or between about 0.1 wt % and 3 wt %.

Figure 2F:
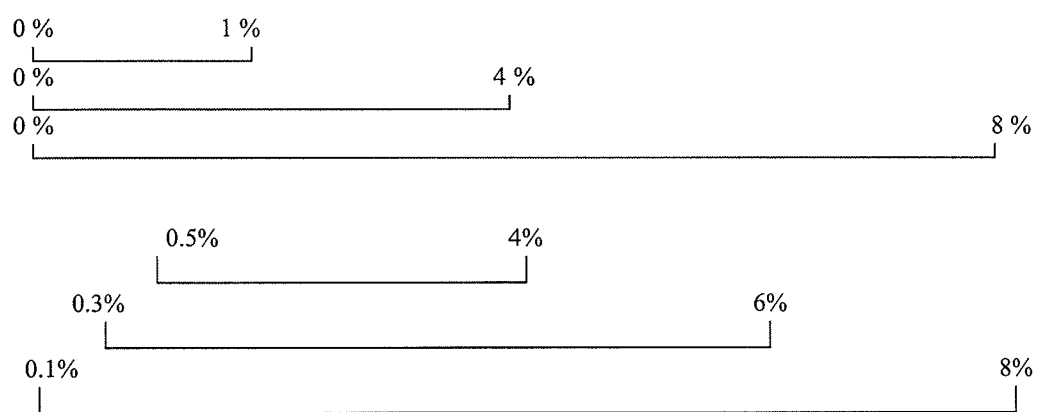
FIG. 2F shows plasticizer concentration ranges used in compositions for forming an airbrake tubing body layer.

In some embodiments, a plasticizer can be employed to increase flexibility and cold impact resistance. In some embodiments, the concentration of plasticizer in the composition may be very low. For example, as shown in FIG. 2F, the composition may comprise approximately 0-8 wt %, or approximately 0-4 wt %, or as little as approximately 0-1 wt % plasticizer. In some embodiments, the composition comprises a plasticizer at approximately 0.1-8 wt %, or approximately 0.3-6 wt %, or approximately 0.5-4 wt % compared to the weight of the unfilled composition. Conventional plasticizers known in the art may be used.

In some embodiments, the air brake tubing composition is unfilled. In some embodiments, the composition comprises one or more fillers. In some embodiments, the composition comprises one or more fillers selected form intercalated graphite particles, borates, siloxanes, phosphates, glass, hollow or solid glass or elastomeric microspheres, silica, silicates, mica, carbon black and the like. Typically, the optional fillers are blended or otherwise admixed with the base polymeric material, and may comprise between about 0.1% and 80% by weight compared to the weight of the unfilled composition.

Figure 3A:
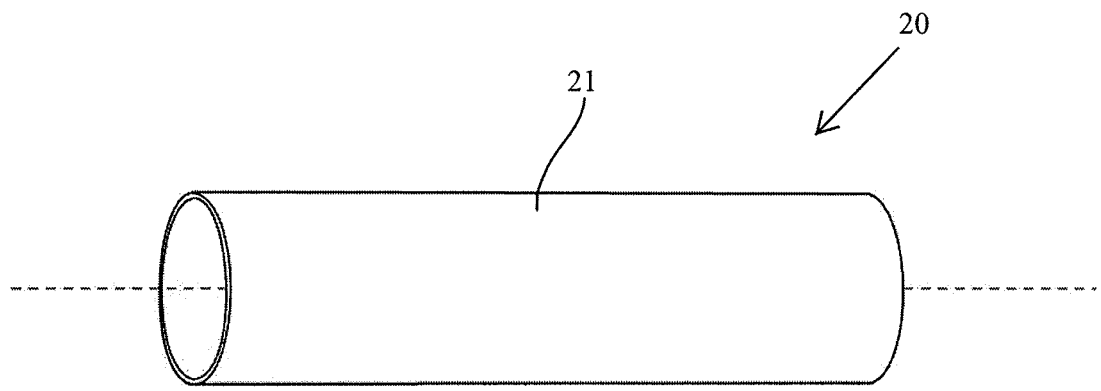
FIG. 3A shows an embodiment of mono-wall air brake tubing.
Figure 3B:
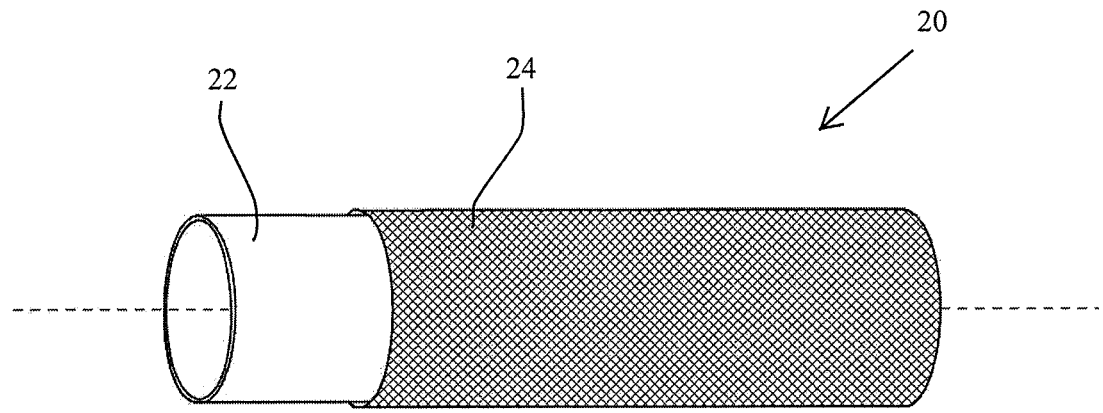
FIG. 3B shows an embodiment of reinforced air brake tubing.
Figure 3C:
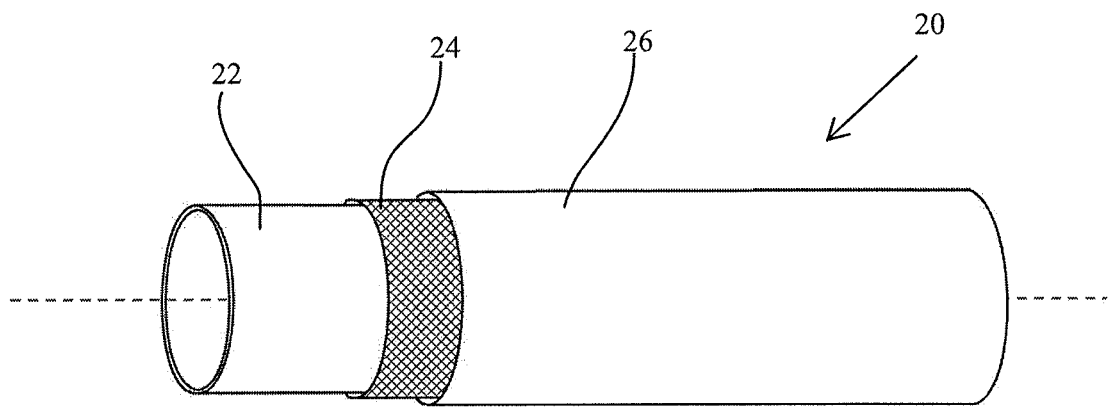
FIG. 3C shows an embodiment of air brake tubing with multi-layer construction.

The FIGS. 3A through 3C show various embodiments of air brake tubing 20. The composition can be used to make one or more layers or wall thicknesses to be used in tubing. A tubing layer comprised of the composition can be used to make a mono-wall tube/hose or can be incorporated into a hose having multiple layers. For example, referring to FIG. 3A, tubing 20 made from the composition can be constructed as mono-wall (i.e. single layer) tubing 21 that meets the size and performance requirements of SAE Standards J844 and J2547, and DOT FMVSS 106. According to embodiments, the tubing may comprise a single layer of the composition and may be formed from a composition comprising, for example, approximately 15-75 wt %, 30-60 wt %, or 40-50 wt % copolyester, polyethylene terephthalate and/or polybutylene terephthalate; approximately 15-75 wt %, 30-60 wt %, or 40-50 wt % polyurethane; and approximately 0-50 wt %, 0-20 wt %, 0-10 wt %, or 0-5 wt % polyamide.

In embodiments, air brake tubing is provided with outer diameter (O.D.) ⅛ inch, 5/32 inch, 3/16 inch, ¼ inch, 5/16 inch, ⅜ inch, ½ inch, ⅝ inch and ¾ inch, with corresponding nominal inside diameter (I.D.) of 0.156, 0.187, 0.218. 0.281. 0.343, 0.406, 0.531, 0.656 and 0.800 inches. Typically, air brake tubing with an O.D.<5/16 inch is type A non-reinforced tubing, and above ⅜ inch O.D. is type B reinforced tubing. In some embodiments, the air brake tubing is a monolayer, or comprises two or more, three or more, four or more, or five or more layers. In some embodiments, the air brake tubing is non-reinforced. In some embodiments, the air brake tubing comprises a reinforcement layer.

Air brake tubing is provided comprising at least one layer formed from a composition comprising copolyester, polyethylene terephthalate and/or polybutylene terephthalate; and polyurethane. In certain embodiments, the composition can be a co-polymer, alloy or blend. In some embodiments, the composition comprises one or more of a copolyester, polyethylene terephthalate and/or polybutylene terephthalate of different Shore A hardness. For example, the copolyester, polyethylene terephthalate and/or polybutylene terephthalate may have a durometer reading of about 30D-80D on the Shore scale, or about 40D-74D, or about 47D-74D, or about 55D-74D, or about 63D-74D, or about 63D and the polyurethane may have a durometer reading of about 54D-74D on the Shore scale, or about 60D-70D, or about 64D, or about 74D. In some embodiments, the composition comprises a medium hardness polymer. In some embodiments, the composition comprises two or more polymers selected from copolyester, polyethylene terephthalate and/or polybutylene terephthalate and the polyurethane, such that one polymer with a higher durometer reading can be used to compensate for another polymer with a lower durometer reading. For example, in some embodiments, the composition comprises a copolyester of 63D hardness and a copolyester of 74D Shore D hardness.

In some embodiments, the brake line tubing is prepared from a composition comprising about 40-50 wt % copolyester, polyethylene terephthalate and/or polybutylene terephthalate; and about 40-50 wt % polyurethane. In some embodiments, the brake line tubing is prepared from a composition comprising about 40-50 wt % copolyester polybutylene terephthalate and/or polyethylene terephthalate; about 40-50 wt % polyurethane; and about 1-15 wt % of a polyamide.

In specific embodiments, the brake line tubing is prepared from a composition comprising about 45-47.5 wt % copolyester, polyethylene terephthalate and/or polybutylene terephthalate; about 45-47.5 wt % polyurethane; and about 5-10 wt % of polyamide 612.

In some embodiments, brake line tubing comprising at least one layer formed from a composition comprising polybutylene terephthalate and polyurethane is provided.

In some embodiments, the brake line tubing comprises at least one layer formed from a composition comprising between about 25-40 wt % polybutylene terephthalate; about 50-65 wt % polyurethane; and about 3-12 wt % of a polyamide; and about 0.1-3 wt % of a heat and/or light stabilizer.

In some specific embodiments, the brake line tubing comprises at least one layer formed from a composition comprising between about 35 wt % polybutylene terephthalate; about 55 wt % polyurethane; about 10 wt % of a polyamide; and about 0.1-3 wt % of a heat and/or light stabilizer.

In some embodiments, the brake line tubing comprises two or more layers. In some embodiments, the brake line tubing comprises at least two layers including a polyamide inner layer and an outer layer prepared from a composition comprising about 45-50/45-50/0-10 wt ratio of copolyester/polyurethane/polyamide. In some specific embodiments, the brake line tubing includes two layers including a polyamide inner layer and an outer layer prepared from a composition comprising 47.5/47.5/5 wt % ratio of copolyester/polyurethane/polyamide.

In some embodiments, the brake line tubing includes three or more layers including an inner and outer layer prepared from a composition comprising about 45-50/45-50/0-10 wt. ratio of EM740 copolyester/Hunt 64D/PA612 and a PA6 or PA12 middle layer.

Tubing 20 made from the composition may also be reinforced as shown in FIG. 3B. The reinforcement 24 may comprise conventional reinforcement materials, such as a wound or braided layer of polyester, nylon or aramid. The composition is also suitable for use in multi-layer tubes as shown in FIG. 3C. Multi-layer tubes may include two or more layers and may comprise, for example, a core 22 comprised of the composition, a wound reinforcement layer 24 and a protective outer layer 26. The outer layer may be constructed of materials such as polyamide, copolyester, polyethylene terephthalate, polybutylene terephthalate, polyurethane or polyolefin or blends, alloys or co-polymers thereof. Other compositions and constructions of multi-layer tubes are also possible.

According to exemplary embodiments, tubing may be made of various compositions as shown in TABLES 2-4. For example, air brake tubing of varying compositions representing Type A, ¼-inch mono-wall construction may be prepared and tested according to SAE J844 and DOT FMVSS 106 testing protocols.

Referring to TABLE 2, sample 1 is formed from a composition comprising between 45-55 wt % thermoplastic polyurethane with a hardness of 64D (available from Huntsman Corp., Salt Lake City, Utah; BASF Corp., Florham Park, N.J.; Lubrizol Corp., Wickliffe, Ohio; Bayer, Morristown, N.J.; or DuPont, Wilmington, Del.) and 45-55 wt % copolyester with a hardness of 74D (available from DSM Engineering Plastics, Birmingham, Mich.; or DuPont). Sample 2 is formed from a composition comprising between 42-52 wt % thermoplastic polyurethane with a hardness of 64D, 42-52 wt % copolyester with a hardness of 74D, and 3-8 wt % polyamide PA612 (available from DuPont; EMS-CHEMIE Inc., Sumter, S. C.; A. Schulman, Inc., Akron, Ohio; or Arkema, King of Prussia, Pa.). Sample 3 is formed from a composition comprising between 40-50 wt % thermoplastic polyurethane with a hardness of 64D, 40-50 wt % copolyester with a hardness of 74D, and 5-15 wt % polyamide PA612.

Referring to TABLE 3, test sample 4 is prepared from a composition comprising between 50-60 wt % of a polyether-based thermoplastic polyurethane (TPU) of Shore D hardness 53 (BASF) and approximately 40-50% polybutylene terephthalate (PBT)(BASF).

Referring to TABLE 4, test sample 5 is formed from a composition comprising between 40-50 wt % TPU, polyether-based thermoplastic elastomer of Shore D hardness 64 (BASF), 40-50 wt % 74 Shore D, extrusion grade copolyester elastomer, Arnitel® (DSM Engineering Plastics, Inc.) and 5-15 wt % polyamide 612. Test sample 6 is formed from a composition comprising between 50-60 wt % TPU, 30-40 wt % thermoplastic copolyester elastomer, stabilized, of 72D Shore D hardness (Hytrel®, DuPont), and 5-15 wt % polyamide 612. Test sample 7 is formed from a composition comprising between 45-52 wt % TPU, polyether-based thermoplastic elastomer (Shore D hardness 64)(BASF), 45-52 wt % 74 Shore D, extrusion grade copolyester elastomer, Arnitel® (DSM Engineering Plastics, Inc.), and 3-8 wt % polyamide 612. The test results of 14 of the most critical test parameters for the exemplary compositions are shown in TABLES 2-4.

TABLE 2

Air Brake Tubing Performance: Test Samples.

| | Specification (U = upper limit, L = lower limit) | Test SAMPLE 1 | Test SAMPLE 2 | Test SAMPLE 3 |
|---|---|---|---|---|
| Polyurethane | | 45-55 wt % | 42-52 wt % | 40-50 wt % |
| Copolyester | | 45-55 wt % | 42-52 wt % | 40-50 wt % |
| Polyamide | | — | 3-8 wt % | 5-15 wt % |
| Ambient Burst Strength | 1206 psi (L) | 1768 psi | 1682 psi | 1587 psi |
| Moisture Absorption, % | 2% (U) | 0.60% | 0.60% | 0.50% |
| Moisture Absorption, psi | 960 psi (L) | 1514 psi | 1515 psi | 1416 psi |
| Low/Cold T. Flexibility | Pass/Fail | Pass | Pass | Pass |
| High T. Flexibility & Burst Strength | 960 psi (L) | 1464 psi | 1560 psi | 1462 psi |
| High T. Cond. (72 h) & Cold T. Impact | 960 psi (L) | 1484 psi | 1536 psi | 1461 psi |
| High T. Cond. (24 h) & Cold T. Impact | 960 psi (L) | 1580 psi | 1650 psi | 1513 psi |
| Boiling Water Cond. & Cold T. Impact | 960 psi (L) | 1435 psi | 1516 psi | 1418 psi |
| Zinc Chloride Resistance | Pass/Fail | Pass | Pass | Pass |
| High T. Cond. & Collapse Resistance | 20% (U) | 7.1% | 8.8% | 6.1% |
| Stiffness | 2 lbs (U) | 1.88 lbs | 1.78 lbs | 1.83 lbs |
| 120° F. Burst | 600 psi (L) | 704 psi | 920 psi | 893 psi |
| 260° F. Burst | 250 psi (L) | 479 psi | 781 psi | 815 psi |
| Tensile Strength | 50 lbf (L) | 117 lbf | 106 lbf | 95 lbf |
| Boiling Water Cond. & Tensile Strength (hot pull), lbf | 50 lbf (L) | 37 lbf | 37 lbf | 37 lbf |
| Boiling Water Cond. & Tensile Strength (hot pull), % | 50% (L) | 91% | 84% | 82% |
| Thermal Cond. & Tensile Strength (Conditioned), lbf | 50 lbf (L) | 122 lbf | 132 lbf | 130 lbf |
| Thermal Cond. & Tensile Strength (Conditioned), % | 50% (L) | 310% | 311% | 294% |
| End Fitting Retention | 960 psi (L) | 1675 psi | 1623 psi | 1434 psi |

T. = Temperature,
Cond. = Conditioning

TABLE 3

Air Brake Tubing Performance: Comparative and Test Samples.

| | Specification (U = upper limit, L = lower limit) | Comparative SAMPLE A | Comparative SAMPLE B | Test SAMPLE 4 |
|---|---|---|---|---|
| Polyurethane | | — | — | 50-60 wt % |
| Copolyester | | — | 90 wt % | — |
| PBT | | — | — | 40-50 wt % |
| Polyamide | | 100 wt % | 10 wt % | — |
| Ambient Burst Strength | 1206 psi (L) | 1373 psi | 1490 psi | 1357 psi |
| Moisture Absorption, % | 2% (U) | 1.0% | 0.4% | 1.04% |
| Moisture Absorption, psi | 960 psi (L) | 1485 psi | 1475 psi | 1303 psi |
| Low/Cold T. Flexibility | Pass/Fail | Pass | Pass | Pass |
| High T. Flexibility & Burst Strength | 960 psi (L) | 1614 psi | 1501 psi | 1270 psi |

TABLE 3-continued

Air Brake Tubing Performance: Comparative and Test Samples.

|  | Specification (U = upper limit, L = lower limit) | Comparative SAMPLE A | Comparative SAMPLE B | Test SAMPLE 4 |
|---|---|---|---|---|
| High T. Cond. (72 h) & Cold T. Impact | 960 psi (L) | 1691 psi | 1473 psi | NT |
| High T. Cond. (24 h) & Cold T. Impact | 960 psi (L) | 1493 psi | 1335 psi | 1348 psi |
| Boiling Water Cond. & Cold T. Impact | 960 psi (L) | 1307 psi | 1296 psi | 1212 psi |
| Zinc Chloride Resistance | Pass/Fail | Pass | Pass | Pass |
| High T. Cond. & Collapse Resistance | 20% (U) | 3.4% | 6.8% | NT |
| Stiffness | 2 lbs (U) | 1.79 lbs | 1.84 lbs | 2.53 lbs |
| 120° F. Burst | 600 psi (L) | 894 psi | 875 psi | 755 psi |
| 260° F. Burst | 250 psi (L) | 459 psi | 493 psi | 425 psi |
| Tensile Strength | 50 lbf (L) | 87 lbf | 92 lbf | 118 lbf |
| Boiling Water Cond. & Tensile Strength (hot pull), lbf | 50 lbf (L) | 46 lbf | 46 lbf | 46 lbf |
| Boiling Water Cond. & Tensile Strength (hot pull), % | 50% (L) | 86% | 106% | 73% |
| Thermal Cond. & Tensile Strength (Conditioned), lbf | 50 lbf (L) | 97 lbf | 101 lbf | 113 lbf |
| Thermal Cond. & Tensile Strength (Conditioned), % | 50% (L) | 159% | 296% | 205% |
| End Fitting Retention | 960 psi (L) | 1390 psi | 1326 psi | 1309 psi |

T. = Temperature,
Cond. = Conditioning,
NT = Not yet Tested

TABLE 4

Air Brake Tubing Performance: Test Samples.

|  | Specification (U = upper limit, L = lower limit) | Test SAMPLE 5 | Test SAMPLE 6 | Test SAMPLE 7 |
|---|---|---|---|---|
| Polyurethane |  | 40-50 wt % | 50-60 wt % | 45-52 wt % |
| Copolyester |  | 40-50 wt % | 30-40 wt % | 45-52 wt % |
| PBT |  | — | — | — |
| Polyamide |  | 5-15 wt % | 5-15 wt % | 3-8 wt % |
| Ambient Burst Strength | 1206 psi (L) | 1412 psi | 1285 psi | 1297 psi |
| Moisture Absorption, % | 2% (U) | 1.13% | 1.30% | 1.14% |
| Moisture Absorption, psi | 960 psi (L) | 1190 psi | 1160 psi | 1274 psi |
| Low/Cold T. Flexibility | Pass/Fail | Pass | Pass | Pass |
| High T. Flexibility & Burst Strength | 960 psi (L) | 1524 psi | 1342 psi | 1337 psi |
| High T. Cond. (72 h) & Cold T. Impact | 960 psi (L) | 1583 psi | 1461 psi | 1240 psi |
| High T. Cond. (24 h) & Cold T. Impact | 960 psi (L) | 1685 psi | 1425 psi | 1395 psi |
| Boiling Water Cond. & Cold T. Impact | 960 psi (L) | 1241 psi | 1069 psi | 1112 psi |
| Zinc Chloride Resistance | Pass/Fail | Pass | Pass | Pass |
| High T. Cond. & Collapse Resistance | 20% (U) | 9.3% | 12.5% | 10.0% |
| Stiffness | 2 lbs (U) | 1.61 lbs | 0.95 lbs | 1.75 lbs |
| 120° F. Burst | 600 psi (L) | 697 psi | 673 psi | 701 psi |
| 260° F. Burst | 250 psi (L) | 406 psi | 356 psi | 519 psi |
| Tensile Strength | 50 lbf (L) | 98 lbf | 89 lbf | 103 lbf |
| Boiling Water Cond. & Tensile Strength (hot pull), lbf | 50 lbf (L) | 37 lbf | 34 lbf | 35 lbf |
| Boiling Water Cond. & Tensile Strength (hot pull), % | 50% (L) | 74% | 84% | 75% |
| Thermal Cond. & Tensile Strength (Conditioned), lbf | 50 lbf (L) | 105 lbf | 108 lbf | 115 lbf |
| Thermal Cond. & Tensile Strength (Conditioned), % | 50% (L) | 258% | 288% | 234% |
| End Fitting Retention | 960 psi (L) | 1428 psi | 1338 psi | 1225 psi |

T. = Temperature,
Cond. = Conditioning

TABLE 2 shows performance of Test Samples 1-3 monolayer tubing samples formed from different compositions comprising copolyester and polyurethane with or without polyamide. Test Samples 1-3, as shown in Table 2, exhibit similar or improved performance in standard tests compared to current marketed brake line tubing Comparative Sample A (PA12) or Comparative Sample B (Polyester/PA blend), as shown in Table 3. In particular, Test Samples 1-3, formed from a composition comprising 40-55 wt % thermoplastic polyurethane, 40-55 wt % copolyester and 0-15 wt % polyamide, exhibited improved end fitting retention, improved performance in boiling water conditioning and cold temperature impact, and improved tensile strength compared to Comparative Samples A and B.

TABLE 3 shows performance of Test Sample 4 shown in Table 3, a monolayer tubing sample formed from a composition comprising 50-60 wt % polyurethane and 40-50 wt % polybutylene terephthalate (PBT) compared to control current marketed Comparative Sample A (ECLIPSE®; Eaton, 100% polyamide) or Comparative Sample B (SOLSTICE®; 90 wt % copolyester blend/10 wt % polyamide), as shown in Table 3. Test Sample 4 approaches the performance of Comparative Sample A and Comparative Sample B in several criteria in the standard tests, as shown in Table 3. In particular, Test Sample 4, formed from a composition comprising 50-60 wt % thermoplastic polyurethane and 40-50 wt % PBT, exhibited improved tensile strength, and improved performance in thermal conditioning and tensile strength (conditioned, lbf) tests compared to Comparative Samples A and B.

TABLE 4 shows performance of Test Samples 5-7 monolayer tubing samples formed from different compositions comprising copolyester and polyurethane with polyamide. Test Samples 5-7, as shown in Table 4, exhibit similar or improved performance in standard tests compared to current marketed brake line tubing Comparative Sample A (PA12) or Comparative Sample B (Polyester/PA blend), as shown in Table 3. In particular, Test Samples 5-7, formed from compositions comprising 40-60 wt % thermoplastic polyurethane; 30-52 wt % copolyester; and 3-15 wt % polyamide exhibit improved performance in boiling water conditioning and cold temperature impact test compared to Comparative Samples A and B.

As shown in TABLES 2-4, improved tensile strength was exhibited by Test Samples 1-3, 5 and 7 as compared to Comparative Samples A and B. Improved end fitting retention was exhibited by Test Samples 1-3 and 5 as compared to Comparative Samples A and B.

As shown in TABLES 2-4, improved performance in Thermal Conditioning & Tensile Strength (conditioned)(lbf) was exhibited by Test Samples 1-7 compared to Comparative Samples A and B.

Figure 4:
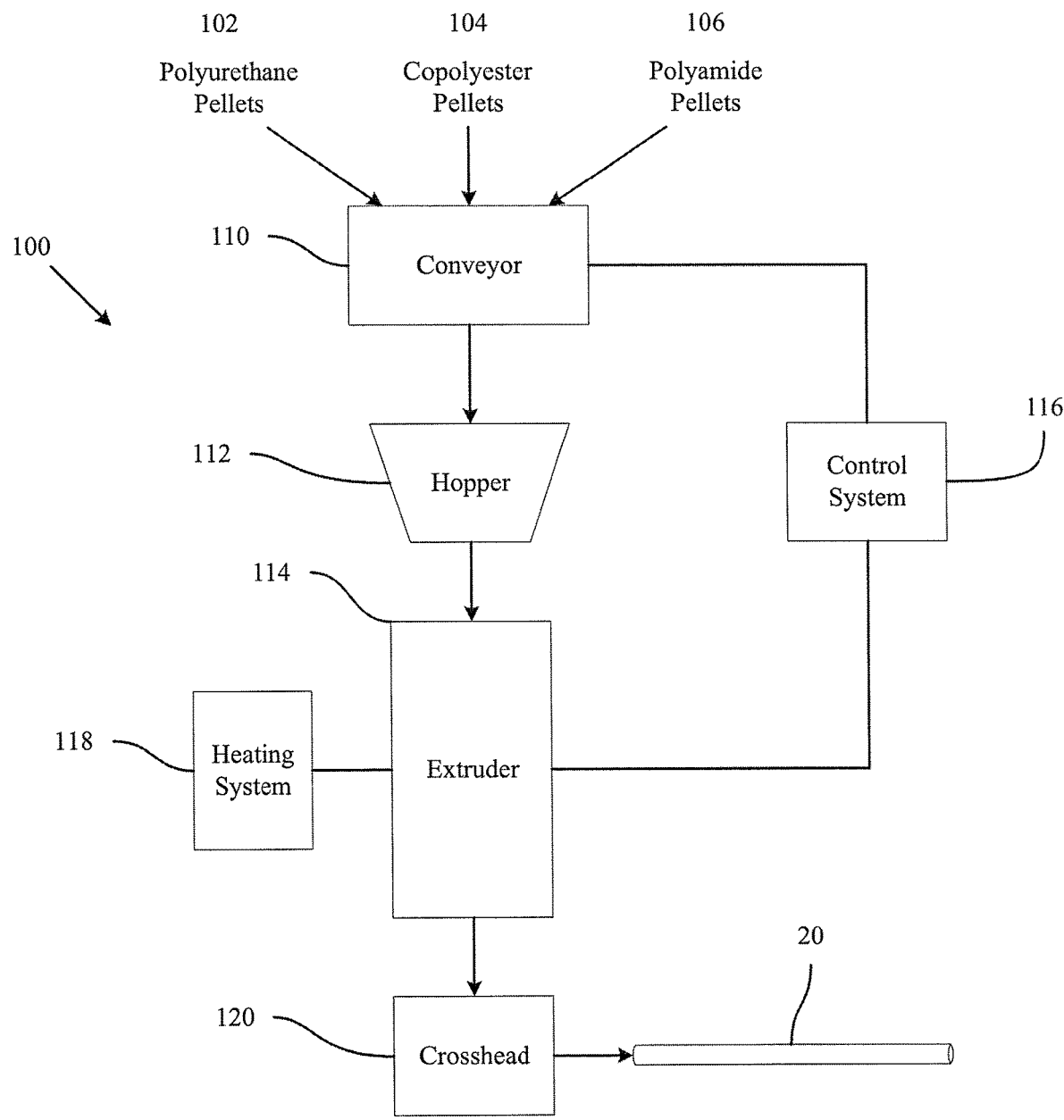
FIG. 4 is a schematic drawing of an extrusion system used to make the air brake tubing according to an embodiment.

An exemplary method for preparing air brake tubing is illustrated in FIG. 4. Tubing 20 comprised of the composition may be manufactured on an extrusion system 100 as shown in FIG. 4. The extrusion system 100 may include, among other components, a conveyor 110, a hopper 112, an extruder 114 (e.g., an auger or screw type extruder), a control system 116, a heating system 118 and a crosshead 120. The components (polyurethane pellets 102, copolyester, polyethylene terephthalate and/or polybutylene terephthalate pellets 104, and optional polyamide pellets 106) used to make the tubing 20 can be metered into a hopper 112 using the conveyor 110 controlled by the control system 116. The components 102, 104, 106 may be in pellet form or any other suitable form. The components 102, 104, and optional 106 can be at least partially mixed in the hopper 112 and then fed into the extruder 114 where the components 102, 104, and optional 106 are further mixed and heated with heat supplied by one or more heating elements of the heating system 118. The components 102, 104, and optional 106 may be under pressure prior to or when exiting the extruder 114 into the cross head 120. The cross head 120 may include a tip and a die (not show) to form the body of the tubing 20. After the extrusion process the tubing 20 may be cooled (e.g., by using a cooling bath) and gathered on a take-up reel. Mixing the components 102, 104, and optional 106 and extruding them directly into tubing 20 without additional heating steps may be beneficial because an additional heating step and therefore degradation of the composition can be avoided. Alternatively it may be desirable in some circumstances to mix and extrude the components 102, 104, and optional 106 to form pellets comprising the composition that can then be formed into tubing 20 at a later time using the extrusion system 100. In certain examples, the composition can be a co-polymer, alloy or blend.

Air brake tubing of the present embodiments may possess superior qualities as compared to existing products by having increased burst strength, reduced moisture absorption, improved impact resistance, increased elevated temperature burst strength, increased tensile strength both before and after thermal conditioning, better fitting retention, lower cost, and may enable the elimination of plasticizers from the product.

From the forgoing detailed description, it will be evident that modifications and variations can be made without departing from the spirit and scope of the disclosure.

What is claimed is:

1. An air brake tubing comprising:
   an air brake tube body comprising at least one layer formed from a composition comprising
   at least one of the group consisting of a copolyester, a polyethylene terephthalate, and a polybutylene terephthalate;
   a thermoplastic polyurethane; and
   a polyamide.

2. The air brake tubing of claim 1, wherein the air brake tubing is capable of meeting the performance requirements of SAE J844, SAE J2547 and DOT FMVSS 106.

3. The air brake tubing of claim 1, wherein the tube body comprises a wound or braided reinforcement layer.

4. The air brake tubing of claim 1, wherein the air brake tubing has a multi-layer construction comprising a core inner layer, a reinforcement layer, and a protective outer layer.

5. The air brake tubing of claim 1, wherein the composition comprises about 15-75 wt % by weight of the copolyester.

6. The air brake tubing of claim 5, wherein the copolyester is selected from one or more copolyesters exhibiting hardness of from 63D-74D on the Shore scale.

7. The air brake tubing of claim 1, wherein the composition comprises about 15-75% by weight of the thermoplastic polyurethane.

8. The air brake tubing of claim 1, wherein the composition comprises about 0.1-20% by weight of the polyamide.

9. A reinforced tubing suitable for use in pneumatic or hydraulic applications, the tubing comprising at least one layer
   formed from a composition comprising about 15-75% by weight copolyester, polyethylene terephthalate or polybutylene terephthalate or combinations thereof; about 15-75% by weight polyurethane, and about 1-15% by weight polyamide.

10. The tubing of claim 9, wherein the tubing is capable of meeting the performance requirements of at least one of SAE J844, SAE 12547 and DOT FMVSS 106.

11. The tubing of claim 9, wherein the tubing comprises a wound or braided reinforcement layer.

12. The tubing of claim 9, wherein the tubing is formed from a composition comprising about 30-60% by weight of the copolyester, polyethylene terephthalate, polybutylene terephthalate or combinations thereof; about 30-60% by weight thermoplastic polyurethane; and about 3-12% by weight polyamide.

13. The air brake tubing of claim 1, wherein the thermoplastic polyurethane is a polyether-based thermoplastic polyurethane.

14. The air brake tubing of claim 1, wherein the polyamide is selected from the group consisting of one or more of PA612, PA6, PA12, PA66, PA610, PA1010, PA1012, PA11, PA12, and PA1212.

15. The air brake tubing of claim 1, wherein the composition is a blend, alloy or copolymer.

16. The air brake tubing of claim 3, wherein the wound or braided reinforcement layer comprises a material selected from the group consisting of polyester, nylon, and aramid.

17. The air brake tubing of claim 1, wherein the at least one layer is selected from the group consisting of an inner layer and an outer layer.

18. The air brake tubing of claim 1, Comprising at least two layers including a polyamide inner layer and an outer layer prepared from a composition comprising about 45-50/45-50/5-10 wt ratio of copolyester/polyurethane/polyamide.

19. The air brake tubing of claim 1, comprising three or more layers including an inner and outer layer prepared from a composition comprising about 45-50/45-50/5-10 wt. ratio of copolyester/thermoplastic polyurethane/polyamide, and a PA6 or PA12 middle layer.

20. The air brake tubing of claim 4, wherein the outer layer comprises a material selected from the group consisting of polyamide, copolyester, polyethylene terephthalate, polybutylene terephthalate, polyurethane blend, and polyolefin blend, or alloys, or co-polymers thereof.

21. The air brake tubing of claim 1, wherein the at least one layer is a single mono-wall layer, an inner layer, or an outer layer.

* * * * *